Figure 3:
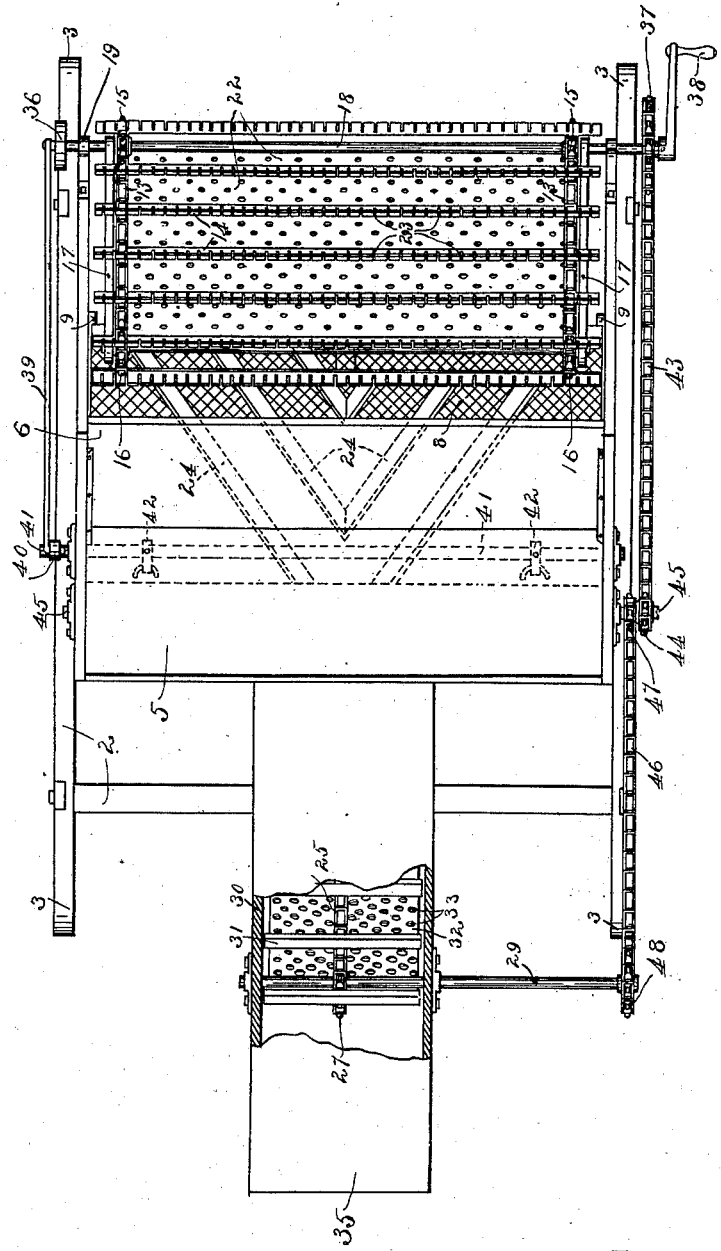

No. 669,858. Patented Mar. 12, 1901.
G. RUNNING.
SMUT MILL.
(Application filed Mar. 22, 1900.)
(No Model.) 2 Sheets—Sheet 1.
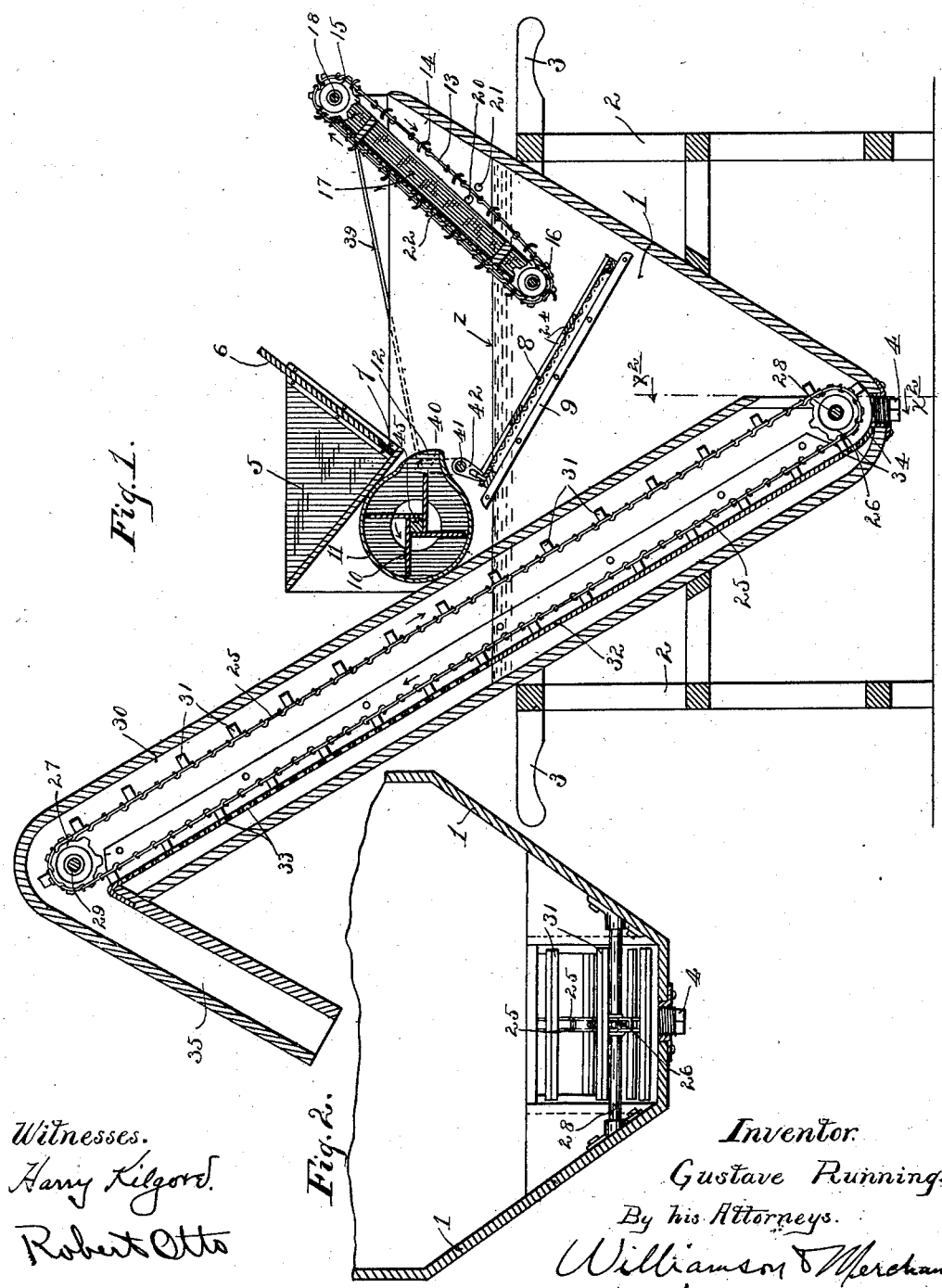
Witnesses.
Harry Kilgord.
Robert Otto
Inventor.
Gustave Running.
By his Attorneys.
Williamson & Merchant No. 669,858.

Patented Mar. 12, 1901.

G. RUNNING.
SMUT MILL.
(Application filed Mar. 22, 1900.)

(No Model.)

2 Sheets—Sheet 2.

Witnesses.
Harry Kilgore,
Robert Otto.

Inventor.
Gustave Running.
By his Attorneys.
Williamson & Merchant

THE NORRIS PETERS CO., PHOTO-LITHO., WASHINGTON, D. C.

UNITED STATES PATENT OFFICE.

GUSTAVE RUNNING, OF MAYVILLE, NORTH DAKOTA, ASSIGNOR TO J. L. OWENS COMPANY, OF MINNEAPOLIS, MINNESOTA.

SMUT-MILL.

SPECIFICATION forming part of Letters Patent No. 669,858, dated March 12, 1901.

Application filed March 22, 1900. Serial No. 9,656. (No model.)

*To all whom it may concern:*

Be it known that I, GUSTAVE RUNNING, a citizen of the United States, residing at Mayville, in the county of Traill and State of North Dakota, have invented certain new and useful Improvements in Smut-Mills; and I do hereby declare the following to be a full, clear, and exact description of the invention, such as will enable others skilled in the art to which it appertains to make and use the same.

My invention has for its object to provide an improved smut-mill for cleaning smut from wheat, barley, oats, and other grains or seeds; and to this end it consists of the novel devices and combinations of devices hereinafter described, and defined in the claims.

The improved mill is illustrated in the accompanying drawings, wherein like characters indicate like parts throughout the several views.

Figure 1 is a view in vertical longitudinal section, showing the complete mill. Fig. 2 is a transverse vertical section taken approximately on the line $x^2$ $x^2$ of Fig. 1, and Fig. 3 is a plan view of the machine with some parts broken away.

The numeral 1 indicates a large hopper which is tapered toward its bottom in all directions, as indicated in Figs. 1 and 2. This hopper is supported by a frame 2, which, as shown, is provided with projecting handles 3, which may of course be dispensed with. This hopper 1 is adapted to contain water to the level indicated by $z$ in Fig. 1. This water is usually a solution containing a cleaning material, such as "formaldehyde." At the bottom of the hopper 1 is a removable plug 4, which permits the hopper to be drained of water.

Secured to the sides of the hopper or vat 1 and extending transversely thereof at some little distance above the level of the water $z$ is a feed-hopper 5, provided with an adjustable side 6, which may be moved to open the bottom of said hopper, as shown at 7. The grain to be cleaned is introduced into this hopper 5 and from thence it is fed onto an inclined vibrating sieve 8, movable over guides 9 on the sides of the water hopper or vat 1.

As the grain falls from the feed-hopper 5 onto the screen 8 it is precipitated through the blast from a fan 10, the case 11 of which is secured between the sides of the water-hopper 1 immediately below the feed-hopper 5, with its mouth or discharge-opening 12 positioned directly below the hopper-opening 7. This fan receives motion, as hereinafter described, being driven in the direction indicated by the arrow marked on Fig. 1. The blast from this fan thus blows the lighter particles which are mixed with the grain or seeds from the body of the grain, and thus effects the preliminary cleaning of the same. These lighter particles will either be blown entirely from the hopper or vat 1, or if they fall within the same will float upon the surface of the water $z$ and will be taken up and removed by an endless conveyer 13 14, which is mounted to run over sprocket-wheels 15 16, the shafts of which are mounted in the ends of a floating frame 17. The shaft 18, which carries the sprocket-wheels 15, is loosely mounted in bearings 19 on the sides of the hopper 1, and thus serves as a pivot-shaft upon which the frame 17 is free to vibrate. The extreme downward movement of the frame 17 may be limited by a stop 20, which may be adjustably secured in any one of several perforations or seats formed in one side of the hopper 1. The sprocket-chains 13 run upward over a perforated deck or plate 22, which is rigidly secured on the frame 17. The blades or cleats 14 of the said conveyer are preferably formed of concave metallic strips that are formed with numerous closely-positioned narrow slits 23, as best shown in Fig. 1. This endless conveyer 13 14 picks up from the surface of the water $z$ the light and floating particles which have been separated from the grain, including the smut, and as these wet particles are carried upward from the water they are thoroughly drained, inasmuch as the water is permitted to freely run both through the perforations of the deck 22 and through the slits 23 of the cleats 14. The blast from the fan also strikes these particles as they are being conveyed upward by the said endless conveyer, and the perforations and slits noted permit the air to pass through and assist in drying the particles which are picked from the surface of the water. Hence these particles will be deposited in quite dry form.

On the upper surface of the sieve 8 is a plurality of downwardly-diverging cleats 24, which serve to spread the grain which falls upon the said screen. These cleats cause the grain to travel over more of the surface of the screen than if the grain were permitted to travel directly to the lower edge thereof.

The cleaned grain or seed will fall to the bottom of the water hopper or vat 1 and will be taken up by an endless conveyer, the sprocket-chain 25 of which runs over sprocket-wheels 26 and 27, the former of which is carried by a shaft 28, mounted at the bottom of said hopper 1, and the latter of which is carried by a shaft 29, mounted in the sides of an inclined upwardly-extended spout 30 of the said hopper 1. The sprocket-chain 25 carries cleats or lifting-blades 31, which as they pass upward run over a metallic deck or apron 32, which is spaced apart from the lower inclined wall of the spout 30. Above the level of the water $z$ the deck 32 is perforated, as shown at 33, and at its lower extremity it is perforated, as shown at 34. The perforations 34 permit the hopper or vat 1 to be completely drained of water, and the perforations 33 permit the water to run from the grain while it is being elevated toward the upper end of the spout 30. The upper end of the spout 30 opens into a downturned spout-section 35, which delivers the grain which has been cleaned into a suitable receptacle. (Not shown.)

It will be noted that the spout 30 is very much narrower than the hopper or vat 1 and that the said vat is tapered transversely at its lower portion to approximately the same width as the lower end of said spout. A single chain 25 serves to connect all of the grain-lifting cleats 31 at their central portion. This greatly reduces the cost of this portion of the machine.

The driving connections for the various parts are as follows: The shaft 18 at the upper end of the floating conveyer is provided at one end with a crank-disk 36 and at its other end with a sprocket-wheel 37 and a hand-crank 38, by the latter of which said shaft is turned. The crank-disk 36 is connected by a link 39 to an arm 40 of a transverse shaft 41, which shaft is provided with a pair of short arms 42, that are pivotally connected to the upper end of the screen 8. Through these connections the screen 8 will be vibrated when the hand-crank 38 is rotated to drive the endless conveyer 13 14. A sprocket-chain 43 runs over the sprocket-wheel 37 and over a smaller sprocket-wheel 44 on the shaft 45 of the fan 10, and thus the fan is driven. Another sprocket-chain 46 runs over a small sprocket 47 on the said fan-shaft 45 and over a larger sprocket 48, which is secured on the outer end of the shaft 29, and thus the endless conveyer 25 31 is driven.

A machine of the above character may be very cheaply constructed and will operate in a very efficient manner.

The fan may be provided with a discharge-opening arranged to direct the blast or a portion thereof into the spout 30 and against the perforated portion 33 of the deck 32. In this way the blast will be made to assist in drying the grain as it is raised from the water.

What I claim, and desire to secure by Letters Patent of the United States, is as follows:

1. In a smut-mill, the combination with a vat for containing water, of a conveyer operating to gather the floating particles from the surface of the water, a feed-hopper for supplying the grain, and a fan arranged to deliver a blast through the falling grain and onto the particles taken up by said conveyer, substantially as described.

2. In a smut-mill, the combination with a vat for containing water, of a feed-hopper, an endless conveyer arranged to gather the floating particles, a perforated deck over which the said conveyer carries the gathered particles, and a fan arranged to deliver a blast through the falling stream of grain and onto said perforated deck, substantially as described.

In testimony whereof I affix my signature in presence of two witnesses.

GUSTAVE RUNNING.

Witnesses:
ISAAC STEEN,
ASA J. STYLES.